(12) United States Patent
Yamada

(10) Patent No.: US 10,193,170 B2
(45) Date of Patent: Jan. 29, 2019

(54) FUEL CELL MODULE

(71) Applicant: HONDA MOTOR CO., LTD., Tokyo (JP)

(72) Inventor: Takayuki Yamada, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 68 days.

(21) Appl. No.: 15/059,744

(22) Filed: Mar. 3, 2016

(65) Prior Publication Data

US 2016/0268615 A1    Sep. 15, 2016

(30) Foreign Application Priority Data

Mar. 12, 2015  (JP) ................. 2015-049496

(51) Int. Cl.
| | | |
|---|---|---|
| *H01M 8/04223* | (2016.01) | |
| *H01M 8/04082* | (2016.01) | |
| *H01M 8/04014* | (2016.01) | |
| *H01M 8/04007* | (2016.01) | |
| *H01M 8/0612* | (2016.01) | |
| *H01M 8/0662* | (2016.01) | |

(Continued)

(52) U.S. Cl.
CPC ..... *H01M 8/04268* (2013.01); *B60L 11/1883* (2013.01); *H01M 8/04014* (2013.01); *H01M 8/04022* (2013.01); *H01M 8/04067* (2013.01); *H01M 8/04074* (2013.01); *H01M 8/04201* (2013.01); *H01M 8/0625* (2013.01); *H01M 8/0662* (2013.01); *H01M 8/2465* (2013.01); *H01M 2008/1293* (2013.01); *H01M 2250/20* (2013.01); *Y02E 60/525* (2013.01); *Y02T 90/32* (2013.01)

(58) Field of Classification Search
CPC ...... H01M 8/04–8/04268; H01M 8/06–8/0662
See application file for complete search history.

(56) References Cited

U.S. PATENT DOCUMENTS

| | | | |
|---|---|---|---|
| 2004/0197617 A1 | 10/2004 | Kaupert et al. | |
| 2006/0057444 A1* | 3/2006 | Takagi ............. | B01J 8/04 48/198.7 |

(Continued)

FOREIGN PATENT DOCUMENTS

| | | |
|---|---|---|
| DE | 10315255 | 10/2004 |
| DE | 102007018264 | 10/2008 |

(Continued)

OTHER PUBLICATIONS

Japanese Office Action with partial English translation dated May 31, 2016, 5 pages.

(Continued)

*Primary Examiner* — Jonathan G Leong
(74) *Attorney, Agent, or Firm* — Rankin, Hill & Clark LLP

(57) ABSTRACT

A fuel cell unit of a fuel cell module includes a fuel cell stack, a reformer, an evaporator, an exhaust gas combustor, a start-up combustor, and an air preheater. The fuel cell module further includes an air supply channel, a first fuel supply channel, a second fuel supply channel, a switching valve, and an exhaust gas channel. In the exhaust gas channel, the start-up combustor and the air preheater are arranged in the order recited toward the downstream side in a flow direction of a combustion exhaust gas.

7 Claims, 4 Drawing Sheets

(51) Int. Cl.
  *H01M 8/2465* (2016.01)
  *B60L 11/18* (2006.01)
  *H01M 8/124* (2016.01)

(56) References Cited

U.S. PATENT DOCUMENTS

2008/0118800 A1  5/2008  Devriendt et al.
2015/0255811 A1  9/2015  Yoshimine et al.

FOREIGN PATENT DOCUMENTS

| | | |
|---|---|---|
| JP | 2008-135300 | 6/2008 |
| JP | 2009-238623 | 10/2009 |
| JP | 2010-508633 | 3/2010 |
| JP | 2010-235426 | 10/2010 |
| JP | 2012-219008 | 11/2012 |
| JP | 2014-078346 | 5/2014 |

OTHER PUBLICATIONS

German Office Action dated Nov. 30, 2016, with English Translation, 15 pages.
German Search Report dated Nov. 30, 2016, with English Translation 16 pages.

* cited by examiner

FUEL CELL MODULE

CROSS-REFERENCE TO RELATED APPLICATION

This application is based upon and claims the benefit of priority from Japanese Patent Application No. 2015-049496 filed on Mar. 12, 2015, the contents of which are incorporated herein by reference.

BACKGROUND OF THE INVENTION

Field of the Invention

The present invention relates to a fuel cell module including a fuel cell stack formed by stacking a plurality of fuel cells for generating electrical energy by electrochemical reactions of a fuel gas and an oxygen-containing gas.

Description of the Related Art

In general, a solid oxide fuel cell (SOFC) employs a solid electrolyte. The solid electrolyte is an oxide ion conductor such as stabilized zirconia. The solid electrolyte is interposed between an anode and a cathode to form an electrolyte electrode assembly (MEA). The electrolyte electrode assembly is sandwiched between separators (bipolar plates). In use, generally, predetermined numbers of the electrolyte electrode assemblies and the separators are stacked together to form a fuel cell stack.

For example, the fuel cell stack is incorporated in a fuel cell system together with a heat processing system disclosed in Japanese Laid-Open Patent Publication No. 2012-219008. This heat processing system includes a reformer, an evaporator, a heat exchanger, an exhaust gas combustor, and a start-up combustor. At the time of starting operation of the system, in the start-up combustor, raw fuel and air (oxygen-containing gas) are combusted to produce a combustion gas, and the combustion gas is used to heat the fuel cell stack and other devices.

Then, by heating operation of the start-up combustor, when the temperature in the exhaust gas combustor exceeds the self-ignition temperature of the fuel gas, combustion by the air and the fuel gas is started in the exhaust gas combustor. Further, when power generation of the fuel cell stack is started, the exhaust gas combustor combusts the fuel gas discharged from the fuel cell stack as a fuel exhaust gas and an oxygen-containing gas discharged from the fuel cell stack as an oxygen-containing exhaust gas to thereby produce a combustion exhaust gas.

SUMMARY OF THE INVENTION

In this regard, if the heating period by combustion of the exhaust gas combustor becomes long, peripheral components around the exhaust gas combustor may be heated excessively. Therefore, in some cases, the peripheral components are damaged by the heat.

The present invention has been made to solve the problem of this type, and an object of the present invention is to provide a fuel cell module in which peripheral components are not heated excessively, and it is possible to suitably perform the heating process efficiently.

A fuel cell module according to the present invention includes a fuel cell stack, a reformer, an evaporator, an exhaust gas combustor, a start-up combustor, and an air preheater. The fuel cell stack contains a plurality of fuel cells stacked, the fuel cells being configured to generate electrical energy by electrochemical reactions of a fuel gas and an oxygen-containing gas. The reformer reforms raw fuel chiefly containing hydrocarbon to thereby produce the fuel gas supplied to the fuel cell stack.

The evaporator evaporates water, and supplies water vapor to the reformer. The exhaust gas combustor combusts the fuel gas discharged from the fuel cell stack as a fuel exhaust gas and the oxygen-containing gas discharged from the fuel cell stack as an oxygen-containing exhaust gas to thereby produce a combustion exhaust gas. The start-up combustor combusts the raw fuel and the oxygen-containing gas to thereby produce a combustion gas. The air preheater heats the oxygen-containing gas by heat exchange with one of the combustion gas and the combustion exhaust gas, and supplies the heated oxygen-containing gas to the fuel cell stack.

The fuel cell module further includes an oxygen-containing gas supply channel configured to supply the oxygen-containing gas to the air preheater and thereafter supply the oxygen-containing gas from the air preheater to the fuel cell stack. The fuel cell module further includes a first fuel supply channel, a second fuel supply channel, and a channel switching unit. The first fuel supply channel supplies the raw fuel to the start-up combustor. The second fuel supply channel supplies the raw fuel to the evaporator, and thereafter supplies the raw fuel from the evaporator to the reformer. The channel switching unit has a channel switching structure configured to selectively supply the raw fuel to either one of the first fuel supply channel and the second fuel supply channel.

The fuel cell module further includes a reactant exhaust gas channel and an exhaust gas channel. The reactant exhaust gas channel supplies the fuel exhaust gas and the oxygen-containing exhaust gas discharged from the fuel cell stack, to the exhaust gas combustor. The exhaust gas channel extends from a combustion exhaust gas outlet of the exhaust gas combustor. In the exhaust gas channel, the start-up combustor and the air preheater are arranged in the order of the start-up combustor and then the air preheater toward the downstream side in a flow direction of the combustion exhaust gas.

In the present invention, when the first fuel supply channel is selected, the raw fuel is supplied to the start-up combustor, and the combustion gas is produced. This combustion gas is supplied to the air preheater. On the other hand, when the second fuel supply channel is selected, the raw fuel is supplied from the evaporator to the reformer. Then, the raw fuel flows inside the fuel cell stack, and is supplied to the exhaust gas combustor. Further, the raw fuel is supplied to the start-up combustor to thereby produce the combustion exhaust gas. The combustion gas or the combustion exhaust gas produced by the exhaust gas combustor is supplied to the air preheater.

Therefore, even in the case where the exhaust gas combustor is not used, by operation of the start-up combustor, the combustion gas can be supplied to the air preheater. Thus, the exhaust gas combustor is not used for a long period of time, and as a result, it is possible to reliably suppress excessive heating of the peripheral components, and suitably perform the heating process efficiently.

Further, when the fuel cell stack has a high temperature, it is possible to supply the raw fuel to only the second fuel supply channel. Therefore, it is possible to avoid the situation where only the oxygen-containing gas is supplied to the fuel cell stack when the fuel cell stack has a high temperature. Consequently, it becomes possible to reliably suppress oxidation of the fuel cell stack, by the fuel gas (reduction gas) supplied from the reformer.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Figure 1:
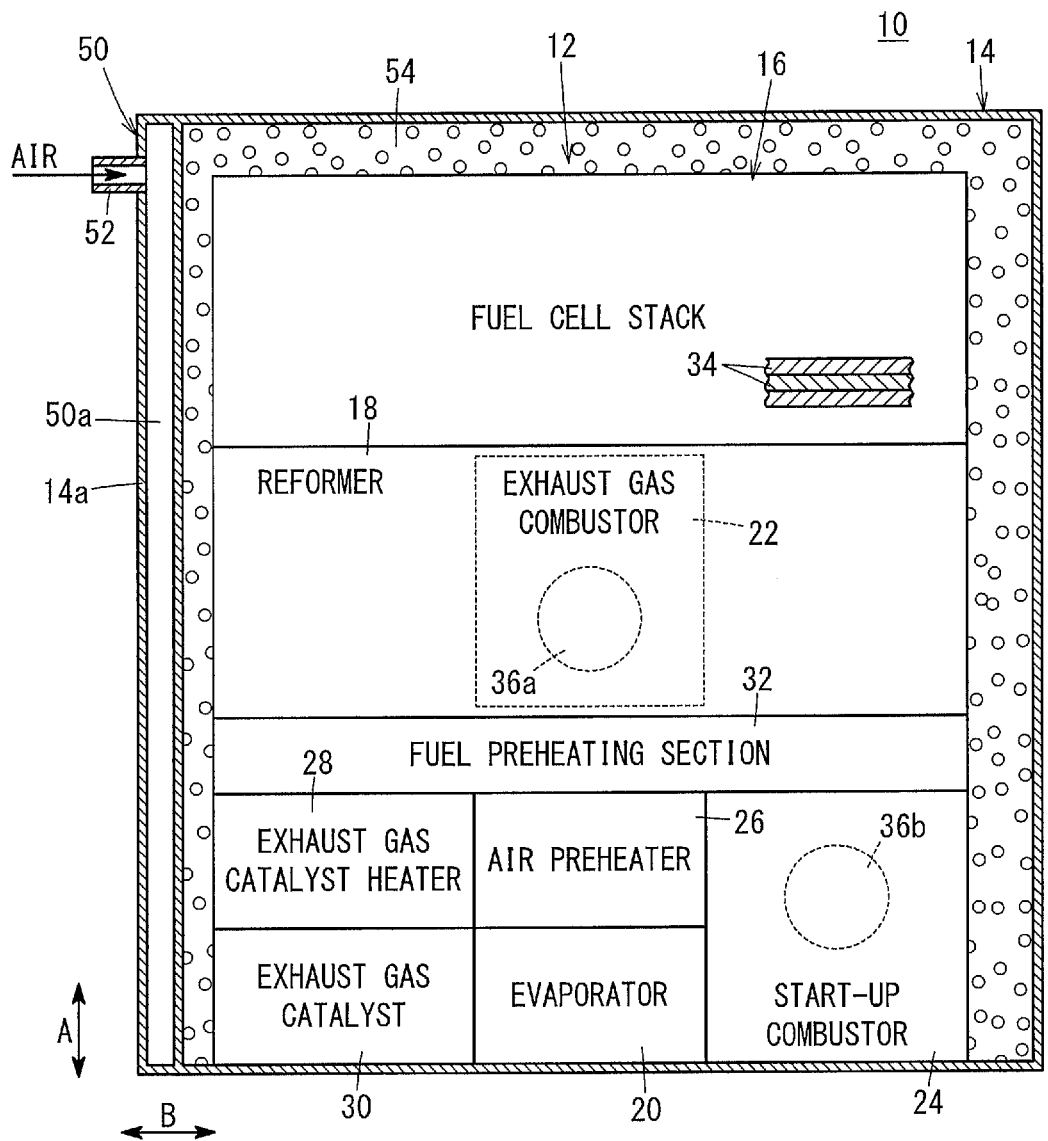
FIG. 1 is a view schematically showing structure of a fuel cell module according to an embodiment of the present invention.

A fuel cell module 10 according to an embodiment of the present invention shown in FIG. 1 may be used in a stationary application. Additionally, the fuel cell module 10 may be used in various applications. For example, the fuel cell module 10 is mounted on a vehicle. The fuel cell module 10 includes a fuel cell unit 12. The fuel cell unit 12 is housed in a casing 14.

Figure 2:
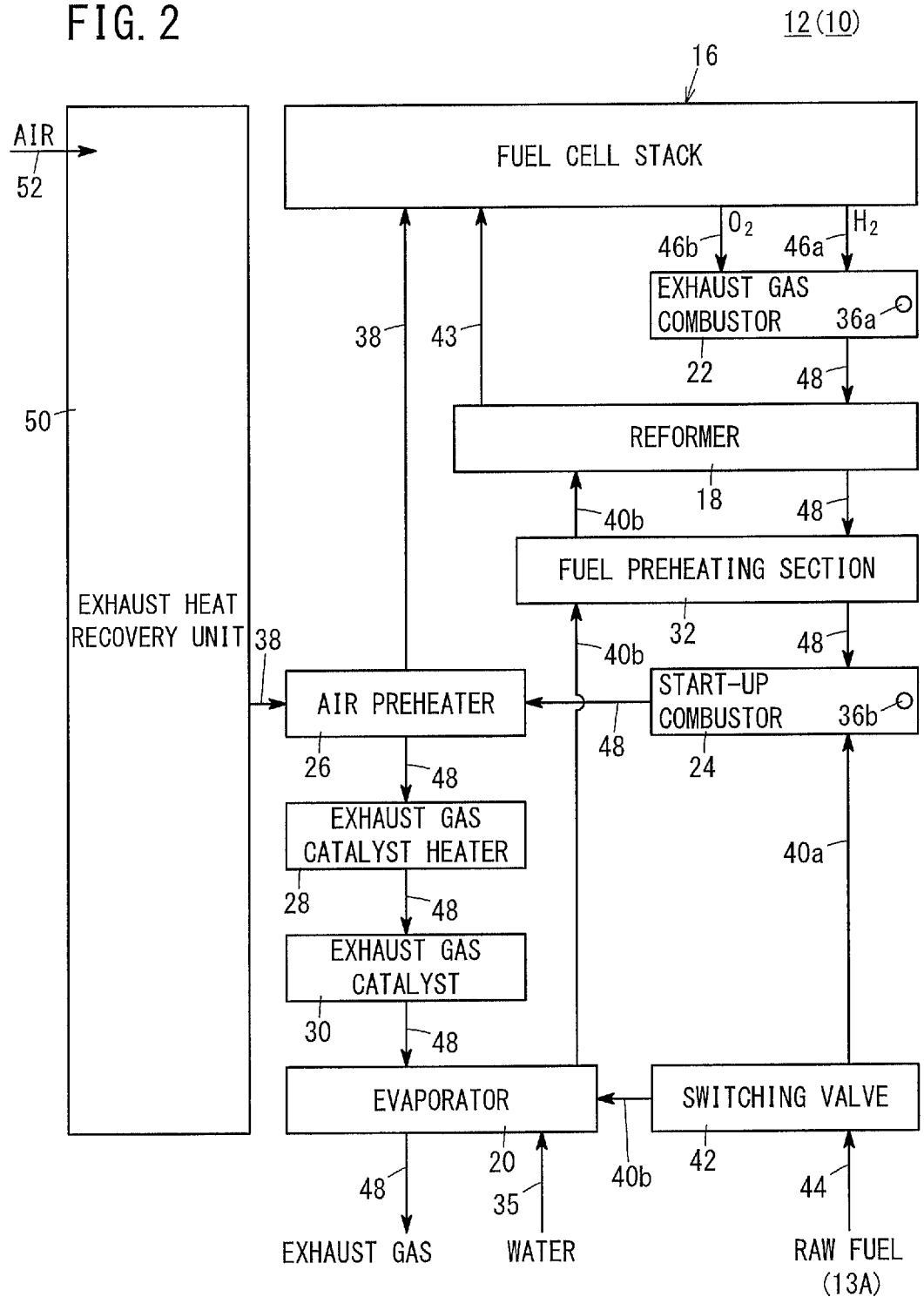
FIG. 2 is a flow diagram of the fuel cell module.

As shown in FIGS. 1 and 2, the fuel cell unit 12 includes a fuel cell stack 16, a reformer 18, an evaporator 20, an exhaust gas combustor 22, a start-up combustor 24, and an air preheater 26. The fuel cell unit 12 further includes an exhaust gas catalyst heater 28 and exhaust gas catalyst 30. A fuel preheating section 32 is provided adjacent to the reformer 18, for heating raw fuel to be supplied to the reformer 18 to a predetermined temperature.

The fuel cell stack 16 generates electrical energy by electrochemical reactions of a fuel gas (mixed gas of a hydrogen gas, methane, and carbon monoxide) and the oxygen-containing gas (air). As shown in FIG. 1, the fuel cell stack 16 includes a plurality of flat-shaped solid oxide fuel cells 34 stacked together in a vertical direction indicated by an arrow A or a horizontal direction indicated by an arrow B.

The fuel cell 34 includes an electrolyte electrode assembly (MEA). The electrolyte electrode assembly includes an anode, a cathode, and an electrolyte interposed between the anode and the cathode. The electrolyte is formed of an oxide ion conductor such as stabilized zirconia, for example. The electrolyte electrode assembly is sandwiched between a cathode separator and an anode separator. An oxygen-containing gas flow field for supplying an oxygen-containing gas to the cathode is formed on the cathode separator, and a fuel gas flow field for supplying a fuel gas to the anode is formed on the anode separator.

The reformer 18 is provided substantially in a U-shape adjacent to the fuel cell stack 16. The exhaust gas combustor 22 is provided inside the reformer 18. The reformer 18 reforms a mixed gas of a raw fuel (e.g., city gas 13A) chiefly containing hydrocarbon and water vapor by steam reforming to thereby produce a fuel gas supplied to the fuel cell stack 16.

The evaporator 20 evaporates water supplied through a water supply channel 35, and supplies water vapor to the reformer 18. The exhaust gas combustor 22 combusts the fuel exhaust gas as a fuel gas discharged from the fuel cell stack 16 and an oxygen-containing exhaust gas as an oxygen-containing gas discharged from the fuel cell stack 16 to thereby produce a combustion exhaust gas.

As shown in FIG. 1, in the reformer 18, the air preheater 26 and the start-up combustor 24 are provided on a side opposite to the fuel cell stack 16. The evaporator 20 is stacked on the air preheater 26. The start-up combustor 24 combusts the raw fuel and the oxygen-containing gas to thereby produce a combustion gas. The air preheater 26 heats the oxygen-containing gas by heat exchange with one of the combustion gas and the combustion exhaust gas, and supplies the heated oxygen-containing gas to the fuel cell stack 16.

As shown in FIG. 2, a first glow plug (ignition member) 36a is provided in the exhaust gas combustor 22, and a second glow plug (ignition member) 36b is provided in the start-up combustor 24. The first glow plug 36a ignites the mixed gas of the fuel exhaust gas and the oxygen-containing exhaust gas. The second glow plug 36b ignites the mixed gas of the raw fuel and the oxygen-containing gas.

The fuel cell module 10 includes an air supply channel (oxygen-containing gas supply channel) 38 for supplying the oxygen-containing gas to the air preheater 26, and then supplying the oxygen-containing gas from the air preheater 26 to the oxygen-containing gas system flow channel (not shown) of the fuel cell stack 16. The fuel cell module 10 includes a first fuel supply channel 40a, a second fuel supply channel 40b, and a switching valve (channel switching unit) 42.

The first fuel supply channel 40a supplies the raw fuel to the start-up combustor 24. The second fuel supply channel 40b supplies the raw fuel to the evaporator 20, and then supplies the raw fuel (and the water vapor) from the evaporator 20 to the reformer 18 through the fuel preheating section 32. A fuel gas supply channel 43 for supplying the fuel gas (reformed gas) prepared by steam reforming, to a fuel gas inlet of the fuel cell stack 16 is connected to the reformer 18.

The switching valve 42 has a channel switching structure for selectively supplying the raw fuel to either one of the first fuel supply channel 40a and the second fuel supply channel 40b. The first fuel supply channel 40a and the second fuel supply channel 40b are connected to a raw fuel supply channel 44 through the switching valve 42.

A fuel exhaust gas outlet of the fuel cell stack 16 is connected to the exhaust gas combustor 22 by a fuel exhaust gas channel (reactant exhaust gas channel) 46a. An oxygen-containing exhaust gas outlet of the fuel cell stack 16 is connected to the exhaust gas combustor 22 by an oxygen-containing exhaust gas channel (reactant exhaust gas channel) 46b.

An exhaust gas channel 48 extends from the combustion exhaust gas outlet of the exhaust gas combustor 22. In the exhaust gas channel 48, the combustion exhaust gas produced by the exhaust gas combustor 22 is supplied to the reformer 18 and devices in the subsequent stages. Further, in the exhaust gas channel 48, the combustion gas produced by the start-up combustor 24 is supplied to the air preheater 26 and devices in the subsequent stages.

In the exhaust gas channel 48, the reformer 18, the fuel preheating section 32, the start-up combustor 24, the air preheater 26, the exhaust gas catalyst heater 28, the exhaust gas catalyst 30, and the evaporator 20 are arranged in the order recited toward the downstream side in the flow direction of the combustion exhaust gas. In the exhaust gas channel 48, the evaporator 20 is provided at the downstream end (most downstream position) in the flow direction of the combustion exhaust gas.

As shown in FIG. 1, the casing 14 has a space 50a inside at least one surface member 14a to form an exhaust heat recovery unit 50. As shown in FIG. 2, the exhaust heat recovery unit 50 is connected to the air supply channel 38, and connected to an air supply source (not shown) through an air inlet pipe 52. The exhaust heat recovery unit 50 may be provided inside two or more surfaces of the surface members (six surfaces) of the casing 14.

The air preheater 26 and the start-up combustor 24 are provided adjacent to each other, or integrally. The reformer 18 and the fuel preheating section 32 are provided adjacent to, or integrally with the exhaust gas combustor 22. The expression "integrally" herein means, for example, a state where one device is incorporated into the other device, or one device and the other device are directly joined together without using a pipe, etc.

As shown in FIG. 1, in order to suppress heat transfer at least among the reformer 18, the evaporator 20, and the air preheater 26, the casing 14 is filled with granular heat insulating material 54.

Operation of this fuel cell module 10 will be described below.

Figure 3:
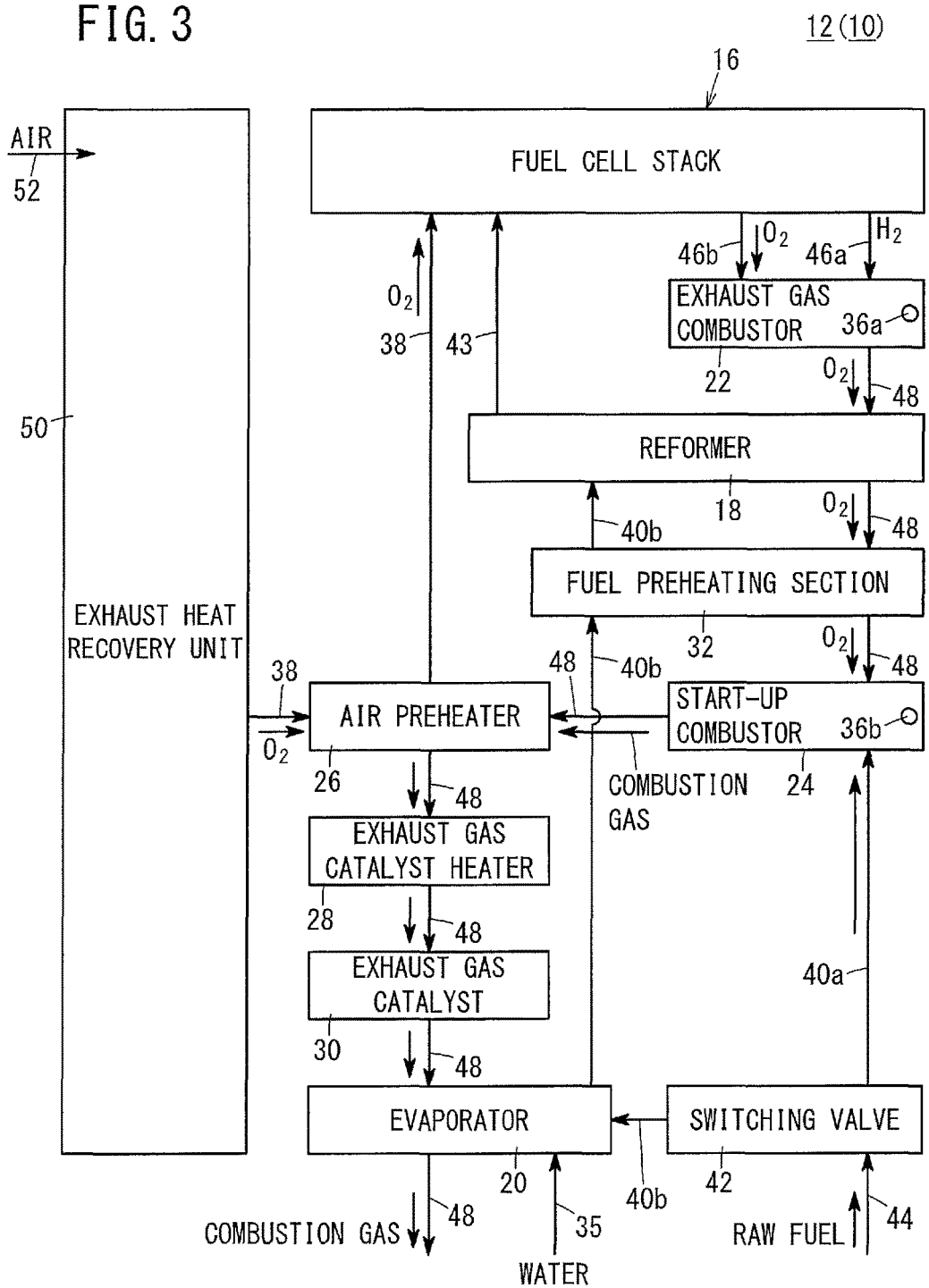
FIG. 3 is a flow diagram at the time of starting operation of the fuel cell module.

At the time of starting operation of the fuel cell module 10, as shown in FIG. 3, the air is supplied into the exhaust heat recovery unit 50 through the air inlet pipe 52, and the air is supplied to the air preheater 26. Then, the second glow plug 36b of the start-up combustor 24 is turned on, and the exhaust gas catalyst heater 28 is turned on.

The air supplied to the air preheater 26 is heated by the combustion gas from the start-up combustor 24 described later, and thereafter flows through the air supply channel 38 to the oxygen-containing gas system flow channel of the fuel cell stack 16. The air from the fuel cell stack 16 flows through the oxygen-containing exhaust gas channel 46b to the exhaust gas combustor 22. Then, the air flows through the reformer 18 and the fuel preheating section 32, and the air is supplied to the start-up combustor 24.

The raw fuel is supplied to the start-up combustor 24. Specifically, by switching operation of the switching valve 42, the raw fuel such as the city gas (containing $CH_4$, $C_2H_6$, $C_3H_8$, $C_4H_{10}$) is supplied from the raw fuel supply channel 44 to the first fuel supply channel 40a.

Therefore, the air and the raw fuel are supplied to the start-up combustor 24, and the mixed gas of the raw fuel and the air is ignited by operation of the second glow plug 36b. Consequently, combustion in the start-up combustor 24 is started, and the combustion gas is produced. The combustion gas flows along the exhaust gas channel 48. The combustion gas is supplied to the air preheater 26, the exhaust gas catalyst heater 28, the exhaust gas catalyst 30, and the evaporator 20 in the order recited, and heating of these devices is started.

In the air preheater 26, the combustion gas supplied from the start-up combustor 24 is used as a heat source, and the air supplied through the air supply channel 38 is heated. The heated air is supplied to the oxygen-containing gas system flow channel of the fuel cell stack 16 to heat the fuel cell stack 16.

Then, when the reformer 18 is heated to a temperature at which the reformer 18 can perform steam reforming, by switching operation of the switching valve 42, the raw fuel supply channel 44 is brought into fluid communication with the second fuel supply channel 40b. Thus, the raw fuel is supplied from the raw fuel supply channel 44 to only the second fuel supply channel 40b.

Figure 4:
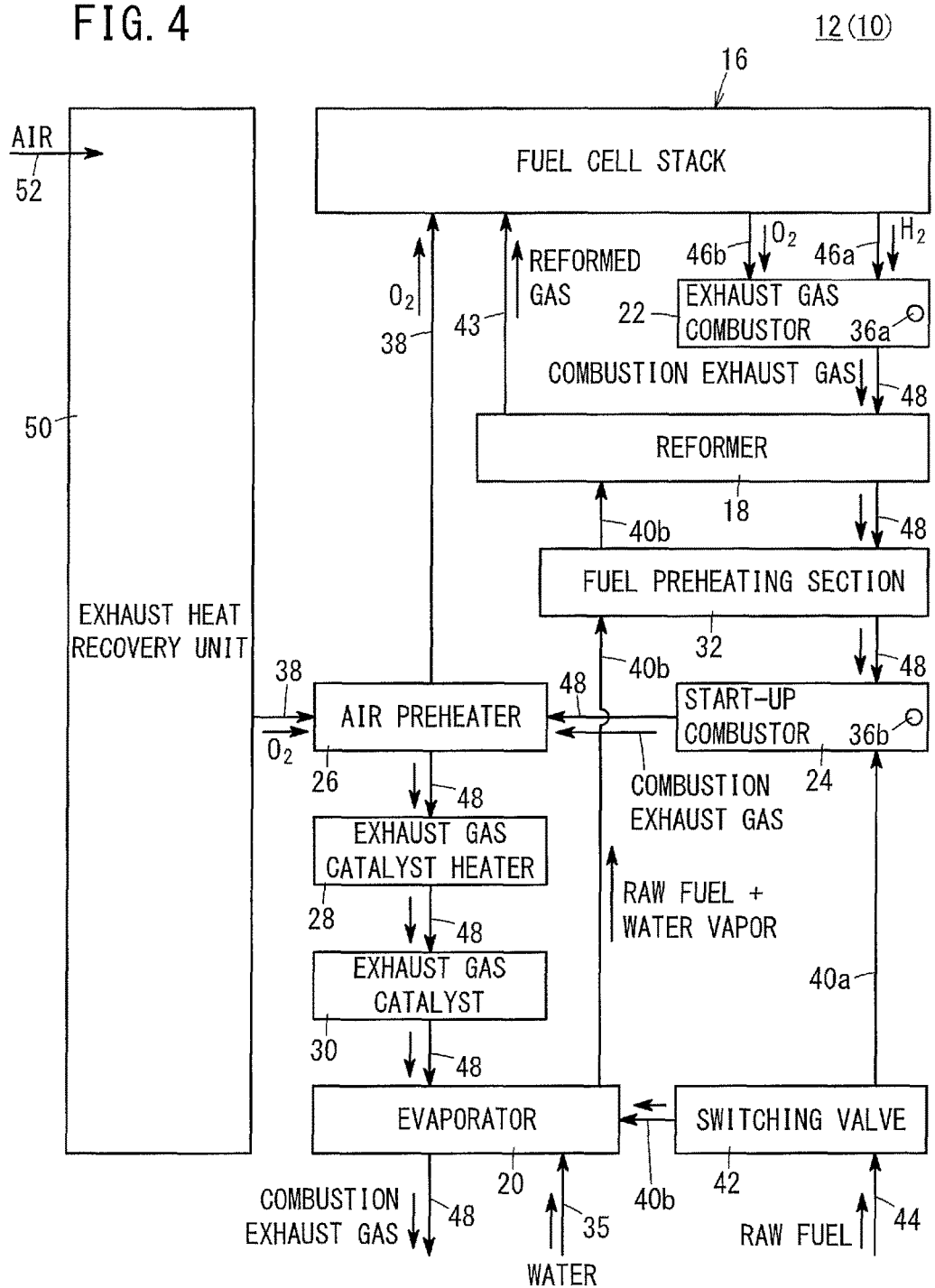
FIG. 4 is a flow diagram during operation of the fuel cell module.

As shown in FIG. 4, water is supplied to the evaporator 20 through the water supply channel 35. Therefore, the raw fuel flowing through the second fuel supply channel 40b is mixed with the water vapor in the evaporator 20. In this state, the raw fuel is supplied through the fuel preheating section 32 to the reformer 18. In the reformer 18, steam reforming of the raw fuel is performed whereby hydrogen carbon of $C_{2+}$ is removed (reformed) and then a reformed gas chiefly containing methane is obtained. The reformed gas flows through the fuel gas supply channel 43, and the reformed gas is supplied to the fuel gas system flow channel of the fuel cell stack 16.

The air having a relatively high temperature is supplied from the oxygen-containing exhaust gas outlet of the fuel cell stack 16 through the oxygen-containing exhaust gas channel 46b to the exhaust gas combustor 22. In the meanwhile, the fuel gas having a relatively high temperature is supplied from the fuel exhaust gas outlet of the fuel cell stack 16 through the fuel exhaust gas channel 46a to the exhaust gas combustor 22.

The hot air and the hot fuel gas are supplied from the reformer 18 and the fuel preheating section 32 to the start-up combustor 24 through the exhaust gas channel 48, and the combustion gas is produced. The combustion gas flows along the exhaust gas channel 48. The combustion gas is supplied to the air preheater 26, the exhaust gas catalyst heater 28, the exhaust gas catalyst 30, and the evaporator 20 in the order recited, and these devices are heated.

The fuel cell stack 16 is heated, and when this fuel cell stack 16 is heated to a temperature at which the fuel cell stack 16 can perform power generation, operation of the fuel cell stack 16 is started. In each of the fuel cells 34 of the fuel cell stack 16, power generation is performed by chemical reactions of the fuel gas and the air. The fuel gas discharged from the fuel cell stack 16 by power generation reaction as the fuel exhaust gas is discharged into the fuel exhaust gas channel 46a. Likewise, the oxygen-containing gas discharged from the fuel cell stack 16 by power generation reaction as the oxygen-containing exhaust gas is discharged into the oxygen-containing exhaust gas channel 46b.

The fuel exhaust gas and the oxygen-containing exhaust gas flows into the exhaust gas combustor 22. Thus, in the exhaust gas combustor 22, the fuel exhaust gas and the oxygen-containing exhaust gas are mixed and combusted to thereby produce the combustion exhaust gas. This combustion exhaust gas flows along the exhaust gas channel 48. The combustion gas is supplied to the reformer 18, the fuel preheating section 32, the start-up combustor 24, the air preheater 26, the exhaust gas catalyst heater 28, the exhaust gas catalyst 30, and the evaporator 20 in the order recited, and these devices are heated. It should be noted that the first glow plug 36a of the exhaust gas combustor 22 is turned on as necessary, and it is not necessary to turn on the first glow plug 36a when the fuel exhaust gas and the oxygen-containing exhaust gas are ignited spontaneously.

In the embodiment of the present invention, as shown in FIG. 3, when the first fuel supply channel 40a is selected, the raw fuel is supplied to the start-up combustor 24, and the combustion gas is produced. This combustion gas is supplied to the air preheater 26.

On the other hand, as shown in FIG. 4, when the second fuel supply channel 40b is selected, the raw fuel is supplied from the evaporator 20 to the reformer 18, and in the reformer 18, steam reforming is performed. Thereafter, the raw fuel flows as the fuel gas into the fuel cell stack 16, and the raw fuel is supplied to the exhaust gas combustor 22. Further, the fuel gas is supplied to the start-up combustor 24, and the air supplied to the fuel cell stack 16 through the air supply channel 38 is supplied to the start-up combustor 24 through the exhaust gas channel 48. Thus, in the start-up combustor 24, a mixed gas of the fuel gas and the air is present, and the mixed gas is ignited to produce the combustion gas. This combustion gas is supplied to the air preheater 26.

Therefore, even in the case where the exhaust gas combustor 22 is not used, by operation of the start-up combustor 24, the combustion gas can be supplied to the air preheater 26. Thus, the exhaust gas combustor 22 is not used for a long period of time, and accordingly it is possible to reliably suppress excessive heating of the peripheral components, and suitably perform the heating process efficiently.

Further, when the fuel cell stack 16 has a high temperature, it is possible to supply the raw fuel to only the second fuel supply channel 40b. Therefore, it is possible to avoid the situation where only the oxygen-containing gas is supplied to the fuel cell stack 16 when the fuel cell stack 16 has a high temperature. Consequently, it becomes possible to reliably suppress oxidation of the fuel cell stack 16, by the fuel gas (reduction gas) supplied from the reformer 18.

Further, in the fuel cell module 10, the air preheater 26 and the start-up combustor 24 are provided adjacent to each other, or integrally. In the structure, the combustion gas produced in the start-up combustor 24 or the combustion exhaust gas produced in the exhaust gas combustor 22 and then supplied to the start-up combustor 24 can be supplied to the air preheater 26 efficiently.

Further, in the exhaust gas channel 48 of the fuel cell module 10, the evaporator 20 is provided at the downstream end (most downstream position) in the flow direction of the combustion gas. Therefore, the combustion gas and the combustion exhaust gas flowing through the exhaust gas channel 48 can be utilized without waste.

Moreover, in the second fuel supply channel 40b, the fuel preheating section 32 is provided between the evaporator 20 and the reformer 18. The fuel preheating section 32 heats the raw fuel supplied to the reformer 18 to a predetermined temperature beforehand. Accordingly, reforming reaction occurs efficiently, and improvement in the power generation efficiency is achieved easily.

Further, the reformer 18 and the fuel preheating section 32 are provided adjacent to, or integrally with the exhaust gas combustor 22. Therefore, the reforming reaction in the reformer 18 occurs efficiently and swiftly, and the process of heating the raw fuel in the fuel preheating section 32 can be performed efficiently and swiftly.

Further, as shown in FIG. 1, the casing 14 of the fuel cell module 10 is filled with granular heat insulating material 54 in order to suppress heat transfer among at least the reformer 18, the evaporator 20, and the air preheater 26. Therefore, it is possible to suppress heat transfer among the peripheral components, and suppress unexpected shortage or excess of the heat.

Moreover, the exhaust heat recovery unit 50 is provided in the casing 14, and the exhaust heat recovery unit 50, the air preheater 26, and then the fuel cell stack 16 are serially connected to the air supply channel 38 in the order recited toward the downstream side in the flow direction of the oxygen-containing gas. Therefore, exhaust heat dissipated from the fuel cell module 10 can be utilized as an energy for heating the oxygen-containing gas before the oxygen-containing gas is supplied to the fuel cell stack 16, and thermally self-sustaining operation can be facilitated. The expression "thermally self-sustaining operation" herein means an operation where the operating temperature of the fuel cell 34 is maintained using only heat energy generated in the fuel cell 34 itself, without supplying additional heat from the outside.

While the invention has been particularly shown and described with reference to a preferred embodiment, it will be understood that variations and modifications can be effected thereto by those skilled in the art without departing from the scope of the invention as defined by the appended claims.

What is claimed is:
1. A fuel cell module comprising:
a fuel cell stack comprising a plurality of fuel cells stacked, the fuel cells being configured to generate electrical energy by electrochemical reactions of a fuel gas and an oxygen-containing gas;
a reformer configured to reform raw fuel chiefly containing hydrocarbon to thereby produce the fuel gas supplied to the fuel cell stack;
an evaporator configured to evaporate water and supply water vapor to the reformer;
an exhaust gas combustor configured to combust the fuel gas discharged from the fuel cell stack as a fuel exhaust gas and the oxygen-containing gas discharged from the fuel cell stack as an oxygen-containing exhaust gas to thereby produce a combustion exhaust gas;
a start-up combustor configured to combust the raw fuel and the oxygen-containing gas to thereby produce a combustion gas; and
an air preheater configured to heat the oxygen-containing gas by heat exchange with one of the combustion gas and the combustion exhaust gas and supply the heated oxygen-containing gas to the fuel cell stack,
wherein the fuel cell module further comprises:
an oxygen-containing gas supply channel configured to supply the oxygen-containing gas to the air preheater and thereafter supply the oxygen-containing gas from the air preheater to the fuel cell stack;
a first fuel supply channel configured to supply the raw fuel to the start-up combustor;
a second fuel supply channel configured to supply the raw fuel to the evaporator and thereafter supply the raw fuel and the water vapor from the evaporator to the reformer;
a channel switching unit configured to selectively supply the raw fuel to either one of the first fuel supply channel and the second fuel supply channel;
a reactant exhaust gas channel configured to supply the fuel exhaust gas and the oxygen-containing exhaust gas discharged from the fuel cell stack, to the exhaust gas combustor; and
an exhaust gas channel extending from a combustion exhaust gas outlet of the exhaust gas combustor, wherein in the exhaust gas channel, the start-up combustor and the air preheater are arranged in an order of the start-up combustor and then the air preheater toward downstream side in a flow direction of the combustion exhaust gas,
wherein after the reformer is heated to a temperature at which the reformer can perform steam reforming and while the fuel cell stack is in a start-up operation before the fuel cell stack starts power generation, the channel switching unit, the reformer, the exhaust gas combustor, and the start-up combustor cause the raw fuel and the water vapor to be supplied to the reformer through the second fuel supply channel to generate the fuel gas, the oxygen-containing gas and the fuel gas discharged from the fuel cell stack to be supplied to the start-up combustor through the exhaust gas combustor, a mixed gas of the oxygen-containing gas and the fuel gas to be ignited at the start-up combustor, the combustion gas to be supplied to the air preheater to be produced, and among the exhaust gas combustor and the start-up combustor, the oxygen-containing gas and the fuel gas discharged from the fuel cell stack to be combusted by only the start-up combustor.

2. The fuel cell module according to claim 1, wherein the air preheater and the start-up combustor are provided adjacent to each other, or integrally.

3. The fuel cell module according to claim 1, wherein, in the exhaust gas channel, the evaporator is provided at a most downstream position in a flow direction of the combustion gas.

4. The fuel cell module according to claim 1, wherein, in the second fuel supply channel, a fuel preheating section is provided between the evaporator and the reformer, the fuel preheating section being configured to heat the raw fuel to be supplied to the reformer, to a predetermined temperature beforehand.

5. The fuel cell module according to claim 4, wherein the reformer and the fuel preheating section are provided adjacent to, or integrally with the exhaust gas combustor.

6. The fuel cell module according to claim 1, wherein the fuel cell module is filled with granular heat insulating material configured to suppress transfer of heat among at least the reformer, the evaporator, and the air preheater.

7. The fuel cell module according to claim 1, wherein an exhaust heat recovery unit is provided around the fuel cell module; and in the oxygen-containing gas supply channel, the exhaust heat recovery unit, the air preheater, and the fuel cell stack are connected in an order of the exhaust heat recovery unit, the air preheater, and then the fuel cell stack toward downstream side in a flow direction of the oxygen-containing gas.

\* \* \* \* \*